United States Patent
Matsunaga (10) Patent No.: US 8,109,774 B2
(45) Date of Patent: Feb. 7, 2012

(54) CONNECTOR HAVING A ROTARY ENGAGING MEMBER

(75) Inventor: Akihiro Matsunaga, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/066,120

(22) Filed: Apr. 7, 2011

(65) Prior Publication Data

US 2011/0189873 A1    Aug. 4, 2011

Related U.S. Application Data

(62) Division of application No. 11/881,960, filed on Jul. 30, 2007, now abandoned, which is a division of application No. 11/394,048, filed on Mar. 30, 2006, now abandoned.

(30) Foreign Application Priority Data

Apr. 5, 2005    (JP) .................. 2005-108769

(51) Int. Cl.
    *H01R 13/62* (2006.01)

(52) U.S. Cl. .................. 439/159; 439/160; 439/607.14

(58) Field of Classification Search .................. 439/159, 439/152, 160, 157, 607.14
    See application file for complete search history.

(56) References Cited

U.S. PATENT DOCUMENTS

| | | | |
|---|---|---|---|
| 6,270,365 B1 | 8/2001 | Nishioka | |
| 6,319,029 B2 * | 11/2001 | Nishioka | 439/159 |
| 6,776,640 B2 | 8/2004 | Nishioka | |
| 6,814,596 B2 | 11/2004 | Yu et al. | |
| 6,814,597 B1 | 11/2004 | Kao | |
| 6,929,491 B1 * | 8/2005 | Chi-Te | 439/159 |
| 6,934,159 B2 | 8/2005 | Nogami | |
| 6,962,500 B1 | 11/2005 | Chen | |
| 7,033,190 B1 | 4/2006 | Chen | |
| 2002/0037658 A1 | 3/2002 | Ozawa | |

FOREIGN PATENT DOCUMENTS

| | | |
|---|---|---|
| JP | 2003243090 | 8/2003 |
| JP | 2003308910 | 10/2003 |

* cited by examiner

*Primary Examiner* — Hien Vu
(74) *Attorney, Agent, or Firm* — Collard & Roe, P.C.

(57) ABSTRACT

In a connector for connecting a connection object having a locked portion, a movable member is provided so as to be movable in a predetermined direction between a connecting position and an ejecting position together with the connection object. A cam mechanism is coupled to the movable member and selectively maintains the movable member at the connecting position or at the ejecting position. A first engaging member is held by the movable member and is rotatable in a rotating direction. The first engaging member has a locking portion to be engaged with the locked portion in the predetermined direction when the first engaging member is located at a predetermined angular position. A braking device is coupled with the first engaging member to brake the first engaging member in the rotating direction.

4 Claims, 6 Drawing Sheets

CONNECTOR HAVING A ROTARY ENGAGING MEMBER

CROSS REFERENCE TO RELATED APPLICATIONS

This application is a divisional application of U.S. application Ser. No. 11/881,960 filed Jul. 30, 2007, which application is a divisional application of U.S. application Ser. No. 11/394,048 filed Mar. 30, 2006, which application claims priority under 35 U.S.C. §119 of Japanese patent application JP 2005-108769 filed Apr. 5, 2005, the disclosures of each of which are hereby incorporated herein by reference.

BACKGROUND OF THE INVENTION

1. Field of the Invention

This invention relates to a connector for electrically connecting a connection object.

2. The Prior Art

In recent years, a card with an IC or a memory built therein is widely used. In order to connect the card of the type, various kinds of connectors have been proposed. As one of those connectors, there is known a card connector which is prevented from being broken even if the card inserted and connected is forcibly removed.

For example, such a card connector is disclosed in Japanese Unexamined Patent Application Publication (JP-A) No. 2003-243090. The card connector comprises a housing for receiving a card so that the card is inserted and removed in forward and backward directions, an ejector movable forward and backward in the housing together with the card, an ejector locking member for locking the movement of the ejector with respect to the housing at a card fitting position, a card locking member to be engaged with the card for locking the movement of the card with respect to the ejector, and an elastic member arranged to be increased in elastic force applied upon the card locking member following the forward movement of the card and the ejector.

In the above-mentioned card connector, the card locking member is, actually, a leaf spring of a cantilevered shape. Therefore, the leaf spring is required to have an elastically deformable portion of a long distance. Accordingly, the above-mentioned card connector is difficult to be reduced in size.

Another card connector is disclosed in Japanese Unexamined Patent Application Publication (JP-A) No. 2003-308910. The card connector comprises a slider to be engaged with a card inserted in the card connector, an ejecting spring for urging the slider in a card ejecting direction, a heart cam for controlling the movement of the slider; a locking mechanism for locking the slider, and a leaf spring mounted to the slider to be engaged with the card. The card connector is designed so that a card locking force of the leaf spring is controlled depending upon a position of the card.

However, such a mechanism for controlling the locking force requires a large space. Therefore, the above-mentioned card connector is difficult to be reduced in size. Further, because of a complicated structure, it is difficult to maintain the reliability.

SUMMARY OF THE INVENTION

It is therefore an object of this invention to provide a connector which can be reduced in size and which is capable of maintaining the reliability with a simple structure.

Other objects of the present invention will become clear as the description proceeds.

According to an aspect of the present invention, there is provided a connector for connecting a connection object having a locked portion, the connector comprising a movable member movable in a predetermined direction between a connecting position and an ejecting position together with the connection object, a cam mechanism coupled to the movable member for selectively maintaining the movable member at the connecting position or at the ejecting position, a first engaging member held by the movable member and rotatable in a rotating direction, the first engaging member having a locking portion to be engaged with the locked portion in the predetermined direction when the first engaging member is located at a predetermined angular position, and a braking device coupled with the first engaging member to brake the first engaging member in the rotating direction.

According to an aspect of the present invention, there is provided a connector to be connected to a connection object having a locked portion, the connector comprising a movable member to be contacted with the connection object and movable together with the connection object, a cam mechanism for selectively maintaining the movable member at a connecting position or an ejecting position of the connection object, and an elastic member for continuously urging the connection object towards the ejecting position, the movable member having an engaging member provided with a locking portion to be engaged with the locked portion, the engaging member being rotatably held by a rotation shaft and adapted to lock a connected state of the connection object, the elastic member continuously urging the locking portion towards the locked portion.

According to an aspect of the present invention, there is provided a connector comprising a housing and an ejecting mechanism formed on the housing to connect a connection object having a locked portion at a connecting position and to eject the connection object to an ejecting position, wherein the ejecting mechanism comprises an ejecting member to be contacted with the connection object and movable together with the connection object, the ejecting member having an engaging member provided with a locking portion to be engaged with the locked portion, a cam mechanism for selectively maintaining the ejecting member at the connecting position or the ejecting position of the connection object, and an elastic member urging the engaging member towards the ejecting position, the engaging member being rotatably held by a rotation shaft formed on the ejecting member and being adapted to lock a fitted state of the connection object, the elastic member urging the locking portion towards the locked portion.

DETAILED DESCRIPTION OF THE DRAWINGS

At first referring to FIGS. 1 to 4, description will be made of a structure of a connector according to an embodiment of this invention.

The connector illustrated in the figures is a so-called card connector for connecting an IC card, such as a SIM card or a SD card, to an electronic apparatus. The connector comprises an insulating housing 11 and a cover frame 31 attached to the housing 11 to cover the housing 11. The housing 11 comprises a main board 13, an ejecting mechanism 21 formed on the main board 13, and a plurality of conductive contacts (signal contacts) 41 disposed on the main board 13.

Figure 1:
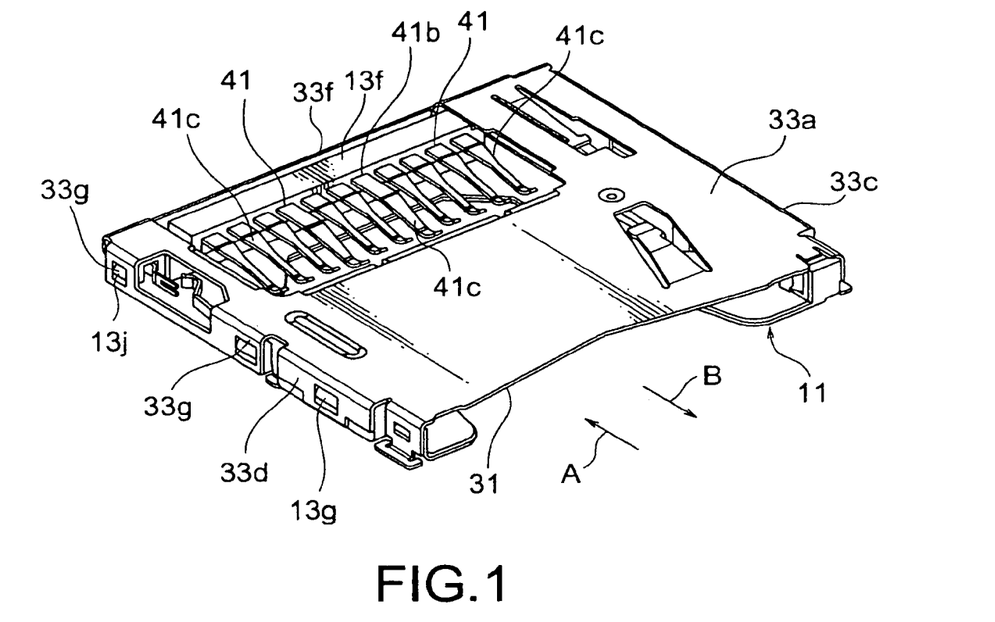
FIG. 1 is a top perspective view of a connector according to an embodiment of this invention.
Figure 2:
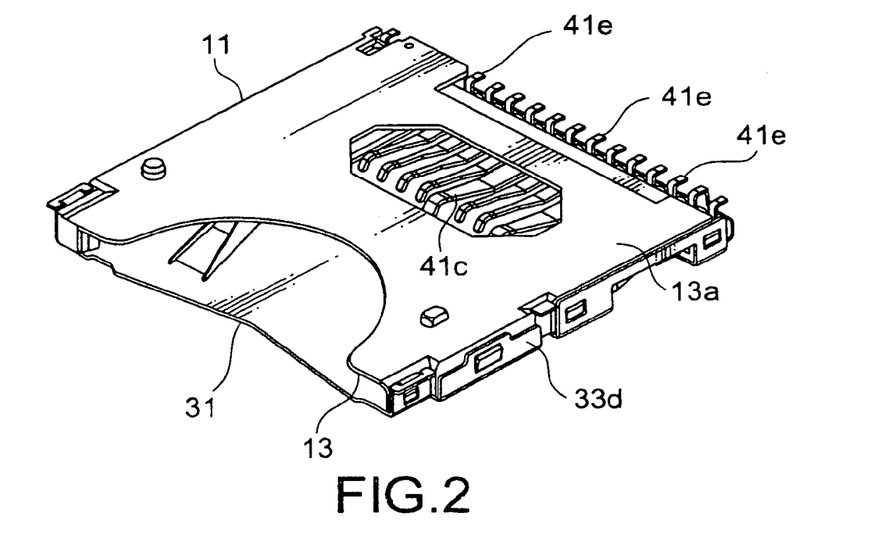
FIG. 2 is a bottom perspective view of the connector illustrated in FIG. 1.

In FIG. 1, a card fitting or connecting direction is depicted by A while a card removing or ejecting direction is depicted by B. The connecting direction A and the ejecting direction B may collectively be called a predetermined direction.

The main board 13 has a main plate portion 13a of a flat shape, first and second side plate portions 13c and 13d formed at opposite ends of the main plate portion 13a in a widthwise direction, respectively, and a bridging portion 13f connecting the first and the second side plate portions 13c and 13d at an end in the card fitting direction A. Between the housing 11 and the cover frame 31, a slot 17 is formed to receive a card 51 as a connection object illustrated in FIG. 5 so that the card 51 is movable in the fitting direction A and the ejecting direction B.

Figure 3:
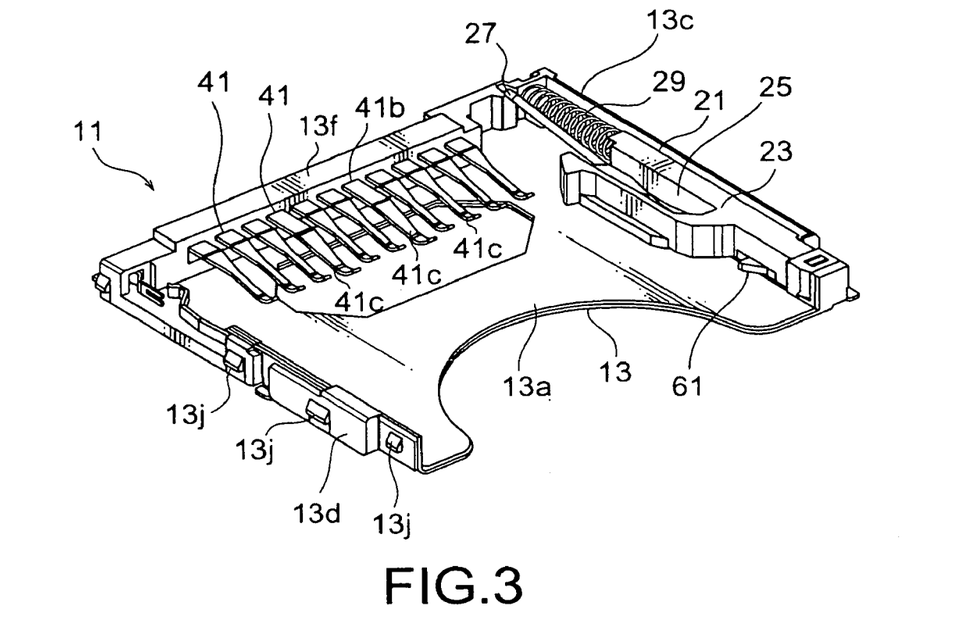
FIG. 3 is a top perspective view of the connector illustrated in FIG. 1 in a state where a cover frame is removed therefrom.
Figure 4:
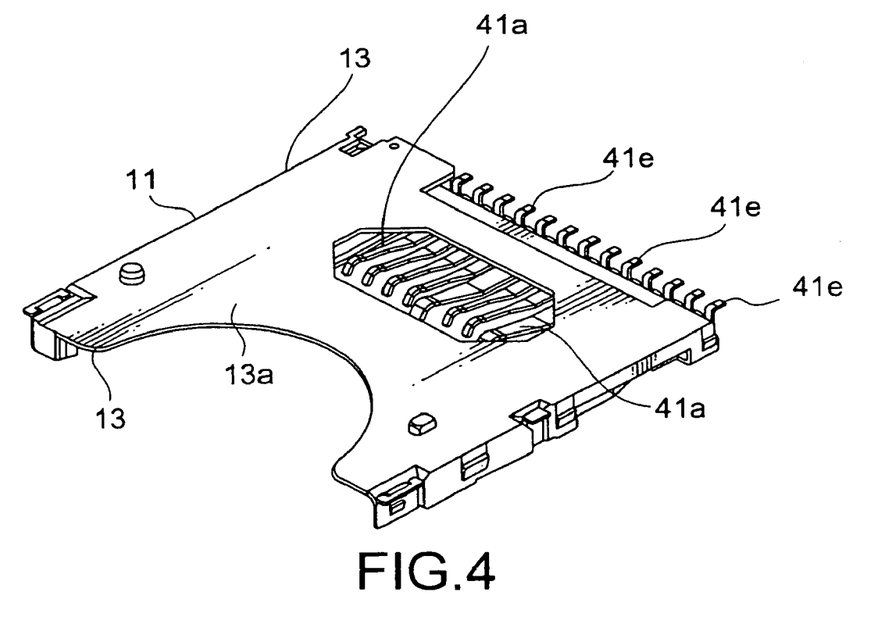
FIG. 4 is a bottom perspective view of the connector in the state illustrated in FIG. 3.

The ejecting mechanism 21 extends inside the first side plate portion 13c in the fitting and the ejecting directions A and B. The ejecting mechanism 21 comprises a movable member, i.e., an ejecting member 23 adapted to be contacted with the card 51 in the predetermined direction and movable between a connecting position and an ejecting position together with the card 51 to eject the card 51, a cam mechanism for selectively maintaining the ejecting member 23 at the connecting position or the ejecting position, and an elastic member 29 comprising a compression coil spring. As illustrated in FIG. 3, the cam mechanism comprises a heart cam 25 as a heart-like groove formed inside the ejecting member 23 and a cam follower 27 inserted to the heart cam 25.

As shown in FIGS. 5 through 8 also, the electing member 23 is provided with two components including first and second engaging members 61 and 71 serving as a locking portion. The first engaging member 61 comprises a locking portion 61a as a hook portion to be inserted into and engaged with a locked portion 51a as a recessed portion formed on one side edge of the card 51, a shaft portion 61b as a hole serving as a rotation center, and a first contacting portion 61c formed by a cam surface for receiving a load of the elastic member 29. The elastic member 29 is interposed between the housing 11 and the second engaging portion 71 and continuously urges the locking portion 61a of the first engaging member 61 towards the locked portion 51a of the card 51.

Under the load, i.e., an urging force of the elastic member 29, the first engaging member 61 is rotated around the shaft portion 61b so that the locking portion 61a is fitted to the locked portion 51a. Specifically, when the first engaging member 61 is located at a predetermined angular position with respect to the ejecting member 23 around a rotation shaft 63 of the ejecting member 23, the locking portion 61a is engaged with the locked portion 51a in the predetermined direction to lock the card 51 at the connecting position.

The second engaging member 71 is received in the ejecting member 23 to be movable in the fitting direction A and the ejecting direction B. The second engaging member 71 has a generally disk-shaped flange portion 71a and a rod-like portion 71b extending from the flange portion 71a in the fitting direction A. The flange portion 71a has a second contacting portion 71c contacted with the first contacting portion 61c of the first engaging member 61.

The rod-like portion 71b is provided with a truncated conical portion 71e tapered in the fitting direction A. One end of the elastic member 29 in the ejecting direction B is received by the flange portion 71a. The rod-like portion 71b is positioned inside the elastic member 29 at a portion near the end thereof. Therefore, the first engaging member 61 is pressed by the second contacting portion 71c of the flange portion 71a and the flange portion 71a is continuously urged by the elastic member 29 in the ejecting direction B.

The contacts 41 are arranged in parallel and spaced from one another in a widthwise direction perpendicular to the fitting and the ejecting directions A and B. Each of the contacts 41 has a holding portion 41a held by the bridging portion 13f, a contacting portion 41c extending from the holding portion 41a towards the main plate portion 13a, and a terminal portion 41e extending from the holding portion 41a to the outside of the bridging portion 13f. The contacting portion 41c of the contact 41 has a free end to be contacted with a card contacting portion (not shown) of the card 51 when the card 51 is received in and fitted to the housing 11. The terminal portion 41e is soldered to a conductor pattern on a printed circuit board (not shown) to which the housing 11 is mounted.

The cover frame 31 comprises a frame plate portion 33a of a flat shape faced to the main plate portion 13a of the main board 13, a pair of first frame side plate portions 33c and 33d faced to outer surfaces of the first and the second side plate portions 13c and 13d, respectively, and a second frame side plate portion 33f faced to an outer surface of the bridging portion 13f. The first frame side plate portions 33c and 33d are provided with a plurality of engaging holes 33g. The engaging holes 33g are engaged in one-to-one correspondence with a plurality of engaging protrusions 13j protruding from the outer surfaces of the first and the second side plate portions 13c and 13d of the housing 11. Thus, the housing 11 and the cover frame 31 are integrally held.

Figure 5:
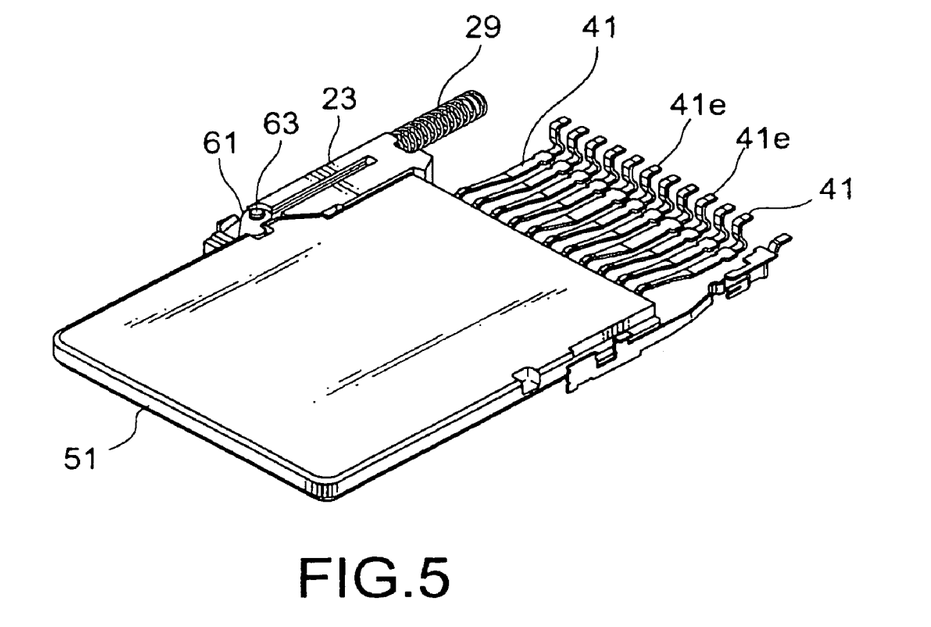
FIG. 5 is a perspective view of an internal mechanism of the connector illustrated in FIGS. 1 and 2 together with a card.
Figure 6:
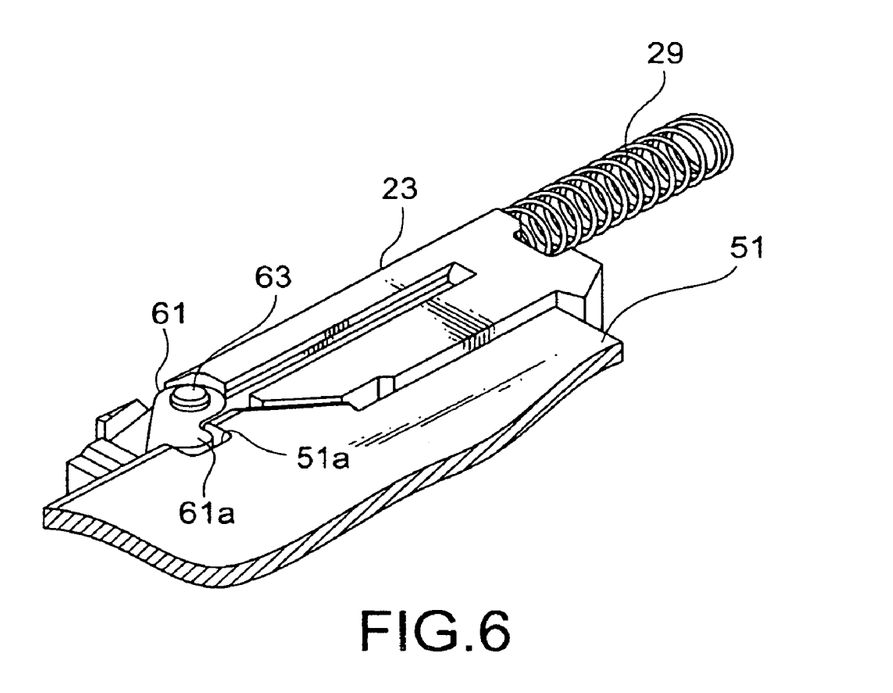
FIG. 6 is an enlarged view of a characteristic part in FIG. 5.
Figure 7:
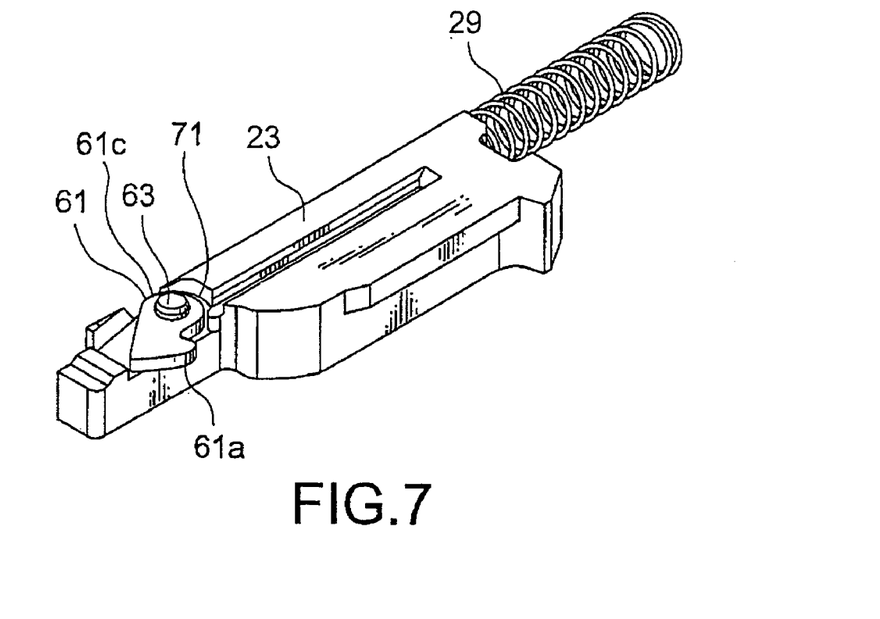
FIG. 7 is a perspective view of an ejecting member of the connector illustrated in FIG. 1.
Figure 8:
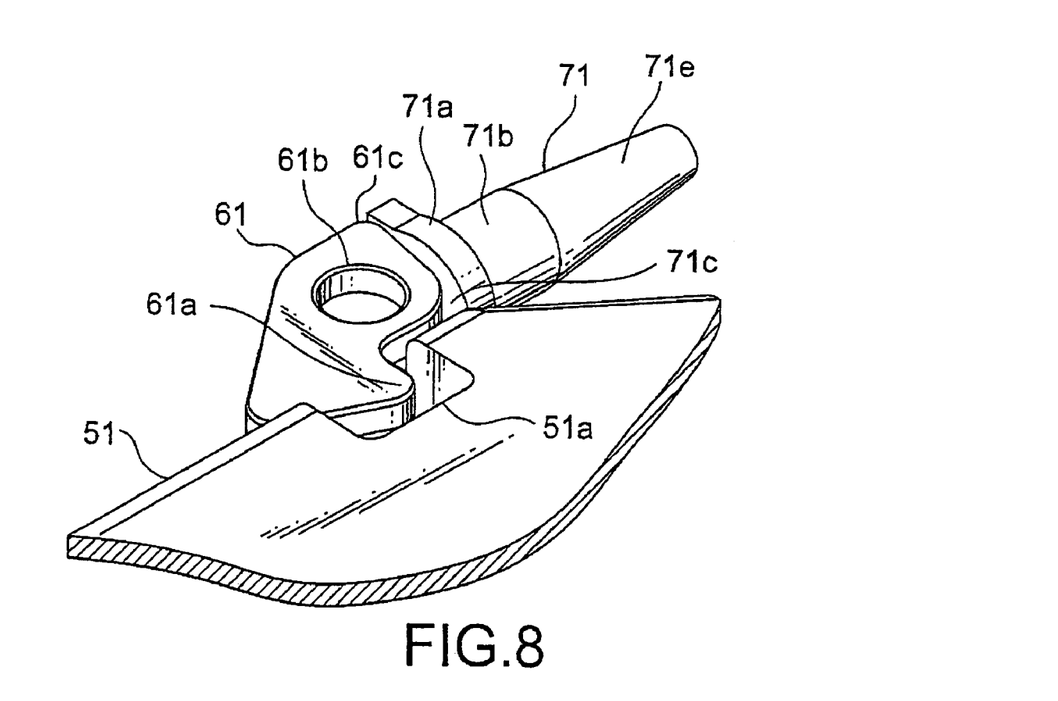
FIG. 8 is an enlarged perspective view of a characteristic part of the ejecting member illustrated in FIG. 7 together with the card.

As illustrated in FIGS. 5 and 6, the locking portion 61a of the first engaging member 61 is fitted to the locked portion 51a of the card 51 to lock the card 51 so that the card 51 can not easily be removed. As illustrated in FIGS. 7 and 8, the first engaging member 61 is rotatably coupled to the ejecting member 23. In the state where the first contacting portion 61c is applied with the load of the elastic member 29 via the second engaging member 71, the first engaging member 61 is rotated around the rotation shaft 63. Thus, the locking portion 61a is kept pressed against the card 51. In other words, the rotation of the first engaging member 61 in a direction of separating the locking portion 61a from the card 51 (i.e., clockwise rotation in FIGS. 7 and 8) is braked by the second engaging member 71 and the elastic member 29. Thus, a combination of the second engaging member 71 and the elastic member 29 serves as a braking device.

Figure 9:
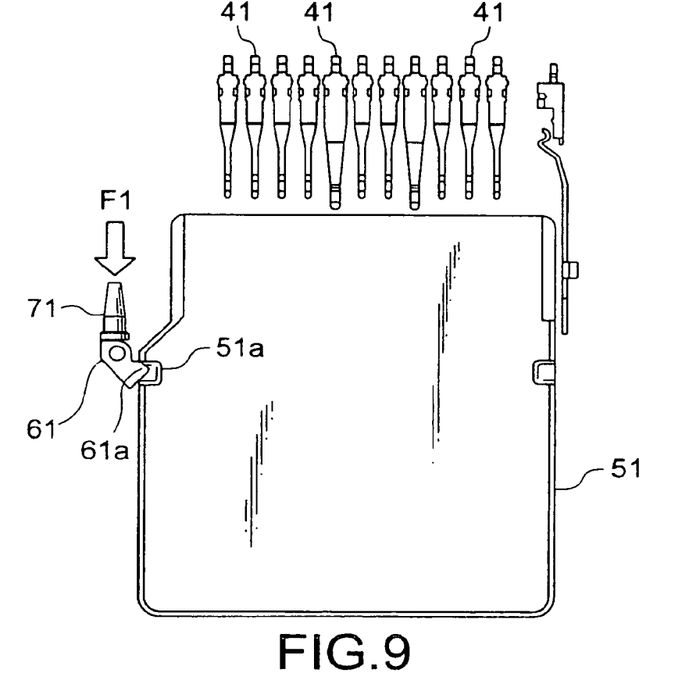
FIG. 9 is a plan view for describing a state where the card is ejected from the connector illustrated in FIG. 1.
Figure 10:
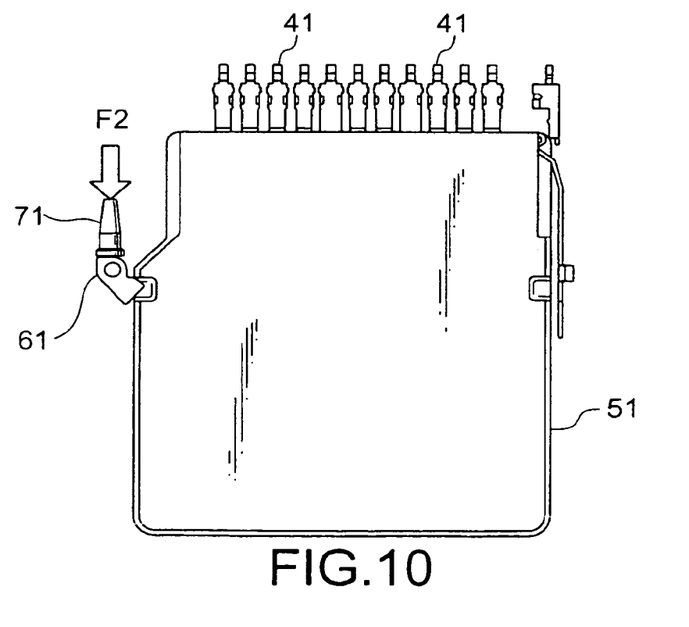
FIG. 10 is a plan view for describing a state where the card is connected to the connector illustrated in FIG. 1.

Referring to FIG. 9, the card 51 is moved out of the housing 11 in the ejecting direction B. In this ejected state, it is assumed that the elastic member 29 applies a force F1 to the first and the second engaging members 61 and 71. Referring to FIG. 10, the card 51 is fitted to the housing 11. In this fitted state, it is assumed that the elastic member 29 applies a force F2 to the first and the second engaging members 61 and 71. Then, the force F1 and the force F2 has a relationship given by:

F1≦F2.

The above-mentioned, relationship means that a locking force of the card 51 at the ejecting position can be equal to or smaller than that at the connecting position.

Thus, it is possible to provide a difference between the urging force of the elastic member 29 at the ejecting position of the card 51 and the urging force of the elastic member 29 at the connecting position of the card 51. Accordingly, it is readily possible to control the locking force so that the locking force is strong in the connected state of the card 51 and is weak in the ejected state of the card 51.

Next referring to FIG. 11, description will be made of an operation of the above-mentioned connector.

Figure 11:
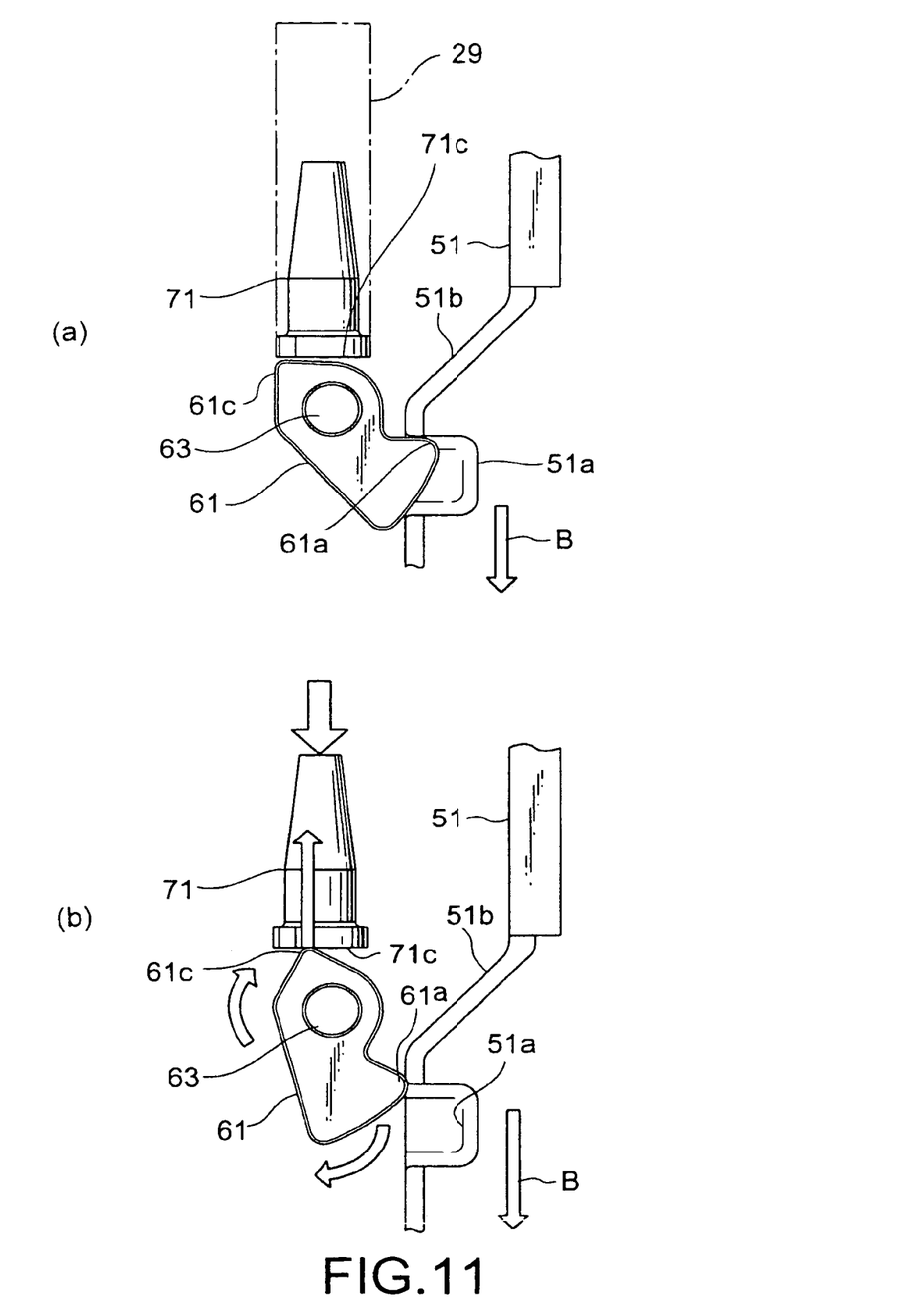
FIG. 11 is a view for describing a principle of operation of a locking mechanism in the connector illustrated in FIG. 1.

In (a) in FIG. 11, the card 51 is at the connecting position. In this state, the elastic member 29 is heavily compressed so that the urging force is large. Under the urging force of the elastic member 29, the second engaging member 71 strongly presses the first contacting portion 61c of the first engaging member 61. Thus, the braking force of the braking device is large. Therefore, the locking portion 61a is engaged with the locked portion 51a of the card 51 in the predetermined direction to securely maintain the card 51 at the connecting position in the connector.

In (b) in FIG. 11, the card 51 is removed without carrying out a normal card ejecting operation. At this time, the locked portion 51a of the card 51 presses the locking portion 61a of the first engaging member 61 in the ejecting direction B. As a consequence, the first contacting portion 61c of the first engaging member 61 presses and moves the second engaging member 71 against the elastic member 29. Therefore, the first engaging member 61 is forcibly rotated clockwise irrespective of the braking force of the braking device. Finally, engagement between the locking portion 61a and the locked portion 51a in the predetermined direction is released so that the card 51 can be removed from the connector. Thus, there is no problem even if the card 51 is removed without carrying out the normal card ejecting operation.

When the normal card ejecting operation is carried out, the ejecting mechanism 21 moves the ejecting member 23 in the ejecting direction B together with the card 51. When the ejecting member 23 reaches the ejecting position together with the card 51, compression of the elastic member 29 is released and the urging force is small so that the braking force of the braking device is small. Therefore, the first engaging member 61 can be relatively easily rotated clockwise. As a consequence, the card 51 can easily be removed from the connector.

As will be understood from the foregoing description, the locking portion 61a and the first contacting portion 61c have phases selected so that, when the card 51 moves from the connecting position to the ejecting position, the locking portion 61a is pressed by an edge of the locked portion 51a of the card 51 to rotate the first engaging member 61 clockwise as shown in (b) of FIG. 11 and, therefore, the first contacting portion 61c presses the second engaging member 71 to move upwardly as shown in (b) of FIG. 11.

On the other hand, when the card 51 is inserted, the first engaging member 61 is rotated to an angular position shown in (b) in FIG. 11 by a slant surface 51b of the card 51. Thus, the card 51 is inserted.

Although this invention has been described in conjunction with the preferred embodiment thereof, this invention may be modified in various other manners within the scope of the appended claims. For example, only a single contact may be used in the connector.

What is claimed is:

1. A connector for connecting a connection object having a locked portion, the connector comprising:
   at least one contact for being in contact with the connection object;
   an ejecting mechanism which is movable relative to the at least one contact in a predetermined direction between a connecting position, wherein the at least one contact is in contact with the connection object, and an ejecting position, wherein the at least one contact is not in contact with the connection object, the ejecting mechanism being moved together with the connection object;
   a first engaging member which is held by the ejecting mechanism and rotatable in a rotating direction, the first engaging member having a cam surface and comprising a locking portion to be engaged with the locked portion in the predetermined direction when the first engaging member is located at a predetermined angular position in the rotating direction;
   a second engaging member having a flanged portion at an end to be engaged perpendicularly with the first engaging member at the cam surface; and
   a compression spring which is coupled to an outer surface of the ejecting mechanism and elastically applies a load to the cam surface in the predetermined direction, wherein the load urges the ejecting mechanism towards the ejecting position, and wherein the cam surface is formed to make the first engaging member be urged in the rotating direction towards the predetermined angular position by the load.

2. The connector according to claim 1, wherein the compression spring has an urging force producing the load, the urging force becoming small when the ejecting mechanism is at the ejecting position as compared with that when the ejecting mechanism is at the connecting position.

3. A connector to be connected to a connection object having a locked portion, the connector comprising:
   at least one contact for being in contact with the connection object;
   an ejecting mechanism which is movable relative to the at least one contact in a predetermined direction between a connecting position, wherein the at least one contact is in contact with the connection object and an ejecting position, wherein the at least one contact is not in contact with the connection object, the ejecting mechanism being moved together with the connection object; and
   a compression spring on an outer surface of the ejecting mechanism for continuously urging the ejecting mechanism towards the ejecting position;
   wherein the ejecting mechanism comprises:
   a rotatable engaging member which is coupled to the compression spring and rotatable in a rotating direction, the rotatable engaging member being provided with a cam surface and a locking portion to be engaged with the locked portion when the rotatable engaging member is located at a predetermined angular position in the rotating direction;

a second engaging member having a flanged portion at an end to be engaged perpendicularly with the rotatable engaging member at the cam surface; and wherein the compression spring elastically applies a load to the rotatable engaging member to urge the ejecting mechanism through the rotatable engaging member in the predetermined direction towards the ejecting position and to urge the rotatable engaging member towards a predetermined angular position where the locking portion is engaged with the locked portion.

4. The connector according to claim 3, wherein the compression spring has an urging force producing the load, the urging force becoming small when the ejecting mechanism is at the ejecting position as compared with when the ejecting mechanism is at the connecting position.

* * * * *